United States Patent
Ramon Real et al.

(10) Patent No.: US 11,439,174 B2
(45) Date of Patent: Sep. 13, 2022

(54) PROCESS FOR ENCAPSULATING HYDROPHOBIC SUBSTANCES

(71) Applicant: CAVIAROLI, S.L., Esparreguera (ES)

(72) Inventors: Ramon Ramon Real, Matadepera (ES); Ramon Maria Ramon Ferres, Esparreguera (ES)

(73) Assignee: CAVIAROLI, S.L., Esparreguera (ES)

( * ) Notice: Subject to any disclaimer, the term of this patent is extended or adjusted under 35 U.S.C. 154(b) by 375 days.

(21) Appl. No.: 15/577,272

(22) PCT Filed: Mar. 15, 2016

(86) PCT No.: PCT/ES2016/070165
§ 371 (c)(1),
(2) Date: Nov. 27, 2017

(87) PCT Pub. No.: WO2016/189173
PCT Pub. Date: Dec. 1, 2016

(65) Prior Publication Data
US 2018/0160719 A1 Jun. 14, 2018

(30) Foreign Application Priority Data
May 27, 2015 (ES) ................. ES201530736

(51) Int. Cl.
| A23P 10/30 | (2016.01) |
| A23D 9/007 | (2006.01) |
| A23L 29/256 | (2016.01) |
| A23L 27/00 | (2016.01) |
| A23L 33/115 | (2016.01) |
| A23D 9/05 | (2006.01) |

(52) U.S. Cl.
CPC .............. *A23P 10/30* (2016.08); *A23D 9/007* (2013.01); *A23D 9/05* (2013.01); *A23L 27/72* (2016.08); *A23L 29/256* (2016.08); *A23L 33/115* (2016.08); *A23V 2002/00* (2013.01)

(58) Field of Classification Search
CPC ......... A23P 10/30; A23L 27/72; A23L 29/256
See application file for complete search history.

(56) References Cited

U.S. PATENT DOCUMENTS

| 2,403,547 | A | 7/1946 | Syplie Peschardt |
| 3,962,383 | A | 6/1976 | Hagiwara et al. |
| 5,635,609 | A | 6/1997 | Levy et al. |
| 2009/0291168 | A1* | 11/2009 | Mangos ............ A23G 4/20 426/89 |
| 2012/0003285 | A1 | 1/2012 | Bibette et al. |

FOREIGN PATENT DOCUMENTS

| GB | 762 700 A | 12/1956 |
| GB | 2 486 945 A | 7/2012 |
| WO | WO 2009/022909 | 2/2009 |
| WO | WO-2009022909 A1 * | 2/2009 ............ A23L 2/38 |

OTHER PUBLICATIONS

What Is Sodium Alginate http://www.visitchem.com/what-is-sodium-alginate/.*
Chan, "Preparation of Ca-alginate beads containing high oil content: Influence of process variables on encapsulation efficiency and bead properties", Carbohydrate Polymers, 2011, 84, pp. 1267-1275.*
Whelehan, "Microencapsulation using vibrating technology", J. Microencapsul., 2011, 28(8), pp. 669-688.*
International Search Report & Written Opinion, dated May 20, 2016, in International Application No. PCT/ES2016/070165.
Phawaphuthanon, N., et al., Characterization of core-shell calcium-alginate macrocapsules fabricated by electro-coextru, *International Journal of Biological Macromolecules*, vol. 65, pp. 267-274, Jan. 23, 2014.
Spanish Search Report, dated Jul. 6, 2015, in ES Application No. 201530736.
Office Action, dated May 20, 2019, in Japanese Patent Application No. 20187-513917.
Jain, S.S., Flow-induced breakup of drops and bubbles, 2017; Downloaded from URL: https://arxiv.org/abs/1701.06157.

\* cited by examiner

*Primary Examiner* — Nikki H. Dees
*Assistant Examiner* — Changqing Li
(74) *Attorney, Agent, or Firm* — Knobbe, Martens, Olson & Bear LLP

(57) ABSTRACT

A method is for generation of capsules containing hydrophobic substances, in particular oily substances, such as essential oils. The capsules are coated with a film of calcium alginate by preparing an aqueous solution of non-calcium alginate and pumping the hydrophobic substance to be encapsulated and the aqueous solution through concentric tubes to produce drops that are introduced into an aqueous solution containing calcium solutions.

9 Claims, No Drawings

PROCESS FOR ENCAPSULATING HYDROPHOBIC SUBSTANCES

PRIORITY AND CROSS REFERENCE TO RELATED APPLICATIONS

This application is the U.S. National Stage Application under 35 U.S.C. § 371 of International Application No. PCT/ES2016/070165, filed Mar. 15, 2016, designating the U.S. and published as WO 2016/189173 A1 on Dec. 1, 2016, which claims the benefit of Spanish Patent Application No. P 201530736, filed May 27, 2015. Any and all applications for which a foreign or a domestic priority is claimed is/are identified in the Application Data Sheet filed herewith and is/are hereby incorporated by reference in their entirety under 37 C.F.R. § 1.57.

FIELD

The present invention relates to a method that allows the encapsulation of hydrophobic substances, in particular oily substances, said capsules being coated with a film of calcium alginate.

SUMMARY

The capsules of hydrophobic substances, in particular oily substances, of the present invention are obtained by a procedure generally known as "spherification". In spherification on an industrial scale, for example, the substance to be encapsulated and a solution of non-calcium alginate are pumped through two concentric tubes with different flow rates in a manner that allows the formation of a drop of the substance to be encapsulated, enveloped by a film of the solution of non-calcium alginate, which acts as a gelling agent. Said drop falls into a bath containing a source of calcium ions, forming a layer of gel that contains the material to be encapsulated. Said film is formed almost instantaneously, being semi-solid and gelatinous on the outside, and holds the encapsulated substance in its interior.

DETAILED DESCRIPTION

A method of industrial spherification is disclosed, for example, in patent application PCT WO 2009/109681 A1, in which food products such as fruit pulp are encapsulated, said food products always being water-based, i.e. the substance to be encapsulated is hydrophilic.

However, the inventor of the present patent is unaware of any spherification procedure in which the substance to be encapsulated is a hydrophobic substance, in particular an oily substance. When the drop of oily substance has a density lower than that of the solution of calcium ions in which the formed drop must fall, it can become a technical problem to ensure that said drop maintains the solutions involved in concentric form, and the gelling reaction of the calcium alginate may occur before the substance to be encapsulated has been released.

In addition, the spherification procedure poses the difficulty that, when it is desired to increase the size of the drop or sphere, said drop or sphere tends to deform due to surface tension, so that when it is introduced into the calcium solution of calcium, the oil may be released and a concentric drop is not successfully formed. This fact significantly affects the aesthetic appearance of said capsules, especially when their intended use is for the consumption of food products in a kitchen.

After exhaustive studies, the inventor of the present patent has developed a spherification method that makes it possible to produce on an industrial scale capsules of hydrophobic substances, in particular oily substances, with a surprisingly spherical form. Moreover, it is possible to increase the diameter of said capsules to sizes of up to 25 mm without affecting their spherical shape.

The method of the present invention is based on the use of a specific ratio of the inner and outer diameters of the concentric tubes that form the drop of oily substance to be encapsulated and the gelling solution, respectively.

Therefore, the present invention discloses a method for the preparation of capsules of hydrophobic substances, characterised in that it comprises the following steps:

a) preparing the aqueous solution of non-calcium alginate in which the concentration of alginate is in the range of 0.05% to 5% by weight of the solution;

b) preparing the hydrophobic substance to be encapsulated;

c) pumping the hydrophobic substance to be encapsulated and the aqueous solution of non-calcium alginate through concentric tubes with a diameter ratio in the range of 1.2 to 5, the hydrophobic substance to be encapsulated being pumped through the inner tube and the aqueous solution of non-calcium alginate being pumped through the outer tube;

d) introducing the drop or drops formed in step (c) into an aqueous solution containing calcium ions;

e) washing, draining and packaging the capsules formed in step (d).

The method of the present invention can be used not only in the food industry but also in the cosmetics, intraceutical, chemical and pharmaceutical industries, or in any other industry that requires these types of capsules.

In the present invention, "hydrophobic substance" refers to any substance that is immiscible or virtually immiscible in water. Said substances may be organic or inorganic, provided that they are hydrophobic substances. For example, said hydrophobic substances include oily substances such as food oils, macerated oils, essential oils, resins, organic compounds immiscible in water and combinations thereof.

For example, in the case of the food industry, the hydrophobic substance to be encapsulated may be a vegetable oil selected from the list comprising olive oil, sunflower oil, hazelnut, sesame oil, walnut oil, almond oil, cotton oil, avocado oil, peanut oil, canola oil, safflower oil, coconut oil, maize oil, palm oil, soya oil, and mixtures thereof.

Moreover, said vegetable oils may be mixed with dressings, aromas, flavours and other additives soluble in oil.

Other types of oily substances that may be encapsulated using the method of the present invention are essential oils selected from the list that includes oil of thyme (*Thymus vulgaris*), oil of oregano (*Origanum vulgaris*), oil of clove (*Syzygium aromaticum*), oil of nutmeg (*Myristica fragrans*), oil of cinnamon (*Cinnamomum zeylanicum*), oil of laurel (*Laurus nobilis*), oil of orange (*Citrus×sinensis*), oil of peppermint (*Mentha piperita*), oil of valerian (*Valeriana officinalis*), oil of citronella (*Cymbopogon nardos*), oil of lavender (*Lavanda angustifolia*), oil of jojoba (*Simmondsia californica*), oil of rosemary (*Rosemarinus officinalis*), oil of neem (*Azadirachta indica*), oil of cottonseed (*Gossypium hirsutum*), oil of rosehip (*Rosa eglanteria*), or mixtures thereof.

It will be obvious to a person skilled in the art that the aqueous solution containing calcium ions used in the method of the present invention can be any source of calcium ions, provided that it is capable of forming a gel of calcium alginate which forms the exterior film of the capsule. Said sources of calcium ions include, for example, calcium chloride, calcium lactate, calcium gluconate, or a mixture thereof. Preferably, the source of calcium ions is calcium chloride.

In addition, said solution of calcium ions may contain any type of additive or may be mixed with any raw material that makes it possible to modify the organoleptic characteristics of the capsule produced.

The alginate solution of the method of the present invention may be any non-calcium alginate salt, provided that it reacts in the presence of calcium ions and forms the exterior calcium alginate film of the capsules. Preferably, the alginate used is sodium alginate. The pH of the alginate solution is between 2 and 14.

An additional advantage of the method of the present invention is that all of the steps are performed at ambient temperature. An increase or decrease in temperature, as well as increasing the production costs of the capsules, may affect the viscosity, density and surface tension of the oily and aqueous phases present in the method, so that it would also be necessary to modify various parameters of the method in order to obtain the same results as at ambient temperature.

In addition, the method of the present invention makes it possible to obtain spherical capsules containing in their interior a hydrophobic substance surrounded by a film of calcium alginate, in which the diameter of said capsules containing hydrophobic substances is in the range of 1 mm to 25 mm, preferably in the range of 2 mm to 25 mm, more preferably 4 mm to 25 mm, even more preferably 6 mm to 25 mm, 8 mm to 25 mm, 10 mm to 25 mm, 12 mm to 25 mm, 14 mm to 25 mm, 16 mm to 25 mm, 18 mm to 25 mm, and most preferably 20 to 25 mm.

EXAMPLES

Example 1. Preparation of Food Capsules Containing Olive Oil According to the Method of the Present Invention In this example, olive oil was encapsulated using the method of the present invention. First, a solution of sodium alginate at a concentration of 1% by weight was prepared. The drops were obtained by pumping through concentric tubes of 2 mm and 6 mm respectively, for the olive oil and the solution of sodium alginate. The drops fell into a solution containing calcium chloride at a concentration of 1% by weight.

At least one capsule 6 mm in diameter was obtained, in which the exterior film had a transparent appearance. Said capsule is suitable for consumption, mainly in restaurants.

Example 2. Preparation of Sesame Oil Capsules

Sesame oil was encapsulated using the method of the present invention. A solution of sodium alginate was prepared at a concentration of 5% by weight, containing 0.1% of potassium sorbate. The drops were obtained by pumping through concentric tubes of 3 mm and 7 mm respectively, for the sesame oil and the solution of sodium alginate. The drops fell into a solution containing calcium chloride at a concentration of 2% by weight.

At least one capsule 7 mm in diameter was obtained, in which the exterior film had a transparent appearance.

Example 3. Preparation of Capsules Containing Rosehip Oil

Rosehip oil was encapsulated using the method of the present invention. A solution of sodium alginate at a concentration of 0.5% by weight was prepared. The drops were obtained by pumping through concentric tubes of 2 mm and 9 mm respectively, for the rosehip oil and the solution of sodium alginate. The drops fell into a solution containing calcium chloride at a concentration of 3% by weight.

At least one capsule 10 mm in diameter was obtained, in which the exterior film had a transparent appearance.

Example 4. Preparation of Capsules Containing Neem Oil

Neem oil was encapsulated using the method of the present invention. A solution of sodium alginate at a concentration of 1% by weight was prepared. The drops were obtained by pumping through concentric tubes of 1 mm and 2 mm respectively, for the neem oil and the solution of sodium alginate. The drops fell into a solution containing calcium chloride at a concentration of 2% by weight.

At least one capsule 2 mm in diameter was obtained, in which the exterior film had a transparent appearance.

Example 5. Preparation of Capsules Containing Lavender Oil

Lavender oil was encapsulated using the method of the present invention. A solution of sodium alginate at a concentration of 2% by weight was prepared. The drops were obtained by pumping through concentric tubes of 5 mm and 25 mm respectively, for the lavender oil and the solution of sodium alginate. The drops fell into a solution containing calcium chloride at a concentration of 2% by weight.

At least one capsule 24 mm in diameter was obtained, in which the exterior film had a transparent appearance.

Although the invention has been described with respect to preferred embodiments, said embodiments must not be regarded as limitative of the invention, which will be defined by the broadest interpretation of the following claims.

What is claimed is:

1. A method for the preparation of spherical capsules of a hydrophobic substance, wherein the method comprises:
    preparing an aqueous solution of non-calcium alginate in which the concentration of alginate is in the range of 0.05% to 5% per cent by weight of the solution;
    pumping a composition consisting of the hydrophobic substance to be encapsulated through an inner tube and the aqueous solution of non-calcium alginate through an outer tube, wherein the inner and outer tubes are concentric tubes with a diameter ratio of the outer to the inner tube in the range of 1.2 to 3, thereby forming drops;
    introducing the drops into an aqueous solution containing calcium ions to form the capsules;
    washing, draining and packaging the capsules wherein the capsules have a diameter in the range of 4 mm to 25 mm.

2. The method according to claim 1, wherein said food oil is mixed with dressings, aromas, flavors, and other food additives soluble in oil.

3. The method according to claim 1, wherein the aqueous solution containing calcium ions is selected from the group consisting of solutions of calcium chloride, calcium lactate, calcium gluconate, and a mixture thereof.

4. The method according to claim 3, wherein the aqueous solution containing calcium ions is a solution of calcium chloride.

5. The method according to claim 1, wherein the non-calcium alginate is sodium alginate.

6. The method according to claim 1, wherein the pH of the alginate solution is between 2 and 14.

7. The method according to claim 1, wherein the capsules have a diameter of 5 mm to 25 mm.

8. The method according to claim 1, wherein the capsules have a diameter of 6 mm to 25 mm.

9. The method of claim 1, wherein the inner tube diameter is bigger than 2 mm and the outer tube diameter is bigger than 5 mm.

\* \* \* \* \*